US005459717A

United States Patent [19]
Mullan et al.

[11] Patent Number: 5,459,717
[45] Date of Patent: Oct. 17, 1995

[54] METHOD AND APPARATUS FOR ROUTING MESSAGERS IN AN ELECTRONIC MESSAGING SYSTEM

[75] Inventors: John A. Mullan, Burke; Fernando Roger, Fairfax, both of Va.

[73] Assignee: Sprint International Communications Corporation, Reston, Va.

[21] Appl. No.: 217,903

[22] Filed: Mar. 25, 1994

[51] Int. Cl.$^6$ ................................................. H04L 12/50
[52] U.S. Cl. .............................. 370/54; 370/58.2; 370/60; 379/220; 340/825.53
[58] Field of Search .................................. 370/54, 58.2, 60, 370/92, 110.1, 58.1, 58.3; 379/93, 220, 90, 94; 340/825.52, 825.53

[56] References Cited

U.S. PATENT DOCUMENTS

| | | | |
|---|---|---|---|
| 5,095,480 | 3/1992 | Fenner | 370/94.1 |
| 5,262,906 | 11/1993 | Mazzola | 370/54 |
| 5,353,283 | 10/1994 | Tsuchiya | 370/60 |

OTHER PUBLICATIONS

Telemail®System marketing pamphlet, Sprint, 1992.
TPX400™ marketing pamphlet, Sprint, 1992.
The International Telegraph and Telephone Consultative Committee (CCITT), Red Book–vol. VIII, "Data Communication Networks: Message Handling Systems," Oct. 8–19, 1984, pp. 3–39.

*Primary Examiner*—Douglas W. Olms
*Assistant Examiner*—Russell W. Blum
*Attorney, Agent, or Firm*—Kenyon & Kenyon

[57] ABSTRACT

A method and apparatus for routing a message embodied in a signal received by an electronic messaging system includes formatting a search key using address codes parsed from a user address specified in the message, where each of the address codes corresponds to a different level of specificity for the user address. An attempt is made to retrieve a record from a database of routing information using the search key. If no record is found, the address code corresponding to the most detailed level of specificity in the user address is stripped from the search key and another attempt is made to retrieve a record. This process continues until a record is successfully retrieved from the database or a predetermined base level of specificity is reached.

23 Claims, 4 Drawing Sheets

| 17 | 18 | 19 | 20 | | | |
|---|---|---|---|---|---|---|
| | | | User Address | | | |
| Route No. | Remote MTA | Local MTA | Country | ADMD | Org. | Name |
| | | | 21 | 22 | 23 | 24 |
| Integer | Char 12 | Char 12 | Char 6 | Char 12 | Char 12 | Char 12 |

FIG. 3

| 25 | | | | 26 | | | | 27 |
|---|---|---|---|---|---|---|---|---|
| Recipient Address | | | | Originator Address | | | | Message Txt |
| Country | ADMD | Org. | Name | Country | ADMD | Org. | Name | Dear John..... |
| 28 | 29 | 30 | 31 | 32 | 33 | 34 | 35 | 36 |

METHOD AND APPARATUS FOR ROUTING MESSAGERS IN AN ELECTRONIC MESSAGING SYSTEM

BACKGROUND OF THE INVENTION

The invention relates to the field of electronic messaging, and specifically to an improved method for routing messages in an electronic messaging system. Electronic messaging is an increasingly popular mode of communications for a wide variety of corporate, government and private sector users. Rapid advances in telecommunications technology have led to equally rapid development of electronic messaging systems to take advantage of new capabilities. Current electronic messaging systems provide the ability to instantaneously transfer information between users anywhere in the world.

An electronic messaging system of a type to which the present invention is directed comprises two major components: a message handling system (MHS) and a message transfer system (MTS). These two components may reside in software executing on a single minicomputer, such as a "DATA GENERAL AVIION" Model 5250 multi-user sewer. Alternatively, separate minicomputers may be dedicated to each component.

The message handling system performs message processing functions, providing users with the ability to compose messages to be sent to others and the ability to read messages received from others. The MHS may include several user agents (UAs) servicing discrete groups of users. Users might typically be grouped by physical location, organization, sub-organization and so on. Each user agent includes software enabling individual users to communicate with the messaging system. Each user has access to a user interface, typically being a personal computer such as an "IBM PS/2 MODEL 70". The user interface communicates with the user agents either directly, via a data line such as RS-232 cable, or indirectly, via a telecommunications line and a modem. An example of a message handling system of this type is the "TELEMAIL" system developed and marketed by "SPRINT INTERNATIONAL".

The message transfer system performs telecommunications switching functions, determining the ideal routing path for a message and transmitting the message along that path. The MTS may include several message transfer agents (MTAs) which communicate with the various user agents of the message handling system. Each MTA is capable of providing message routing functions for one or more user agents, and may be flexibly configured depending on the needs of any particular installation. For example, a message transfer system may contain a first MTA responsible for local delivery of messages (i.e., messages sent between users of the same message handling system) and a second MTA responsible for relaying remote messages (i.e., messages sent between users of two distinct message handling systems). A collection of at least one MTA and zero or more user agents may be referred to as an administration management domain (ADMD). Within an ADMD, user agents obtain message transfer service by interacting with an MTA through submission and delivery procedures. An example of a message transfer system of this type is the "TPX400" system developed and marketed by "SPRINT INTERNATIONAL".

A message transfer system will typically access a routing information data store which associates physical or logical telecommunications paths with particular user addresses. In a typical prior art messaging system, routing information is stored as a hierarchical tree structure containing a number of increasingly-specific levels of classifications, culminating with individual users at the lowest level. For each user defined to the system, the routing information associates an identifier for the telecommunications path that must be followed to send a message to that user.

To illustrate how a message would be composed and routed in an electronic message system configured as above, assume a user wishes to send a message to another user at a remote location serviced by a different electronic messaging system. The user, referred to as a message originator, would compose a message on a user interface using editing functions provided by a user agent. The user agent includes editing routines which ensure the message conforms to the appropriate standards and communications protocols. When the user is satisfied with the message and requests that it be sent, the user agent transmits the message as a digital signal to the message transfer agent servicing that particular user agent. Upon receiving the message, the message transfer agent analyzes the address specified for the recipient and determines the appropriate routing path from the routing information data store. Assuming a routing path exists, the message transfer agent transmits the message along the associated telecommunications line to the electronic messaging system servicing the intended recipient.

While an electronic messaging system capable of routing messages among a group of users in a particular installation or organization clearly has value, one of the challenges for designers of such systems has been providing users with the ability to route messages between different messaging systems. This ability is referred to as "global routing". A primary obstacle to global routing has been the wide variety of messaging systems currently in use, often developed by vendors having their own unique approach to electronic messaging.

To facilitate global routing, the Consultive Committee for International Telegraphy and Telephony (CCITT) developed the X.400 series of recommendations in an effort to standardize electronic messaging systems across different countries and vendors. As part of this effort, messages must be formatted and sent using predefined standards and protocols. A message formatted in compliance with X.400 standards must contain certain items of address information, including an originator/recipient name (O/R name) which includes codes for the originator/recipient user's country, administration management domain, organization and personal name.

Conformance to CCITT standards ensures messages are readily transferable between two electronic messaging systems; however, such conformance limits the flexibility available for configuring messaging systems. One approach to this problem involves maintaining two types of addresses for system users: an internal address related to the administrative configuration of the messaging system, and an external address related to "real world" considerations such as geographic locations and organizational hierarchies. Such an approach is detailed in the U.S. patent application entitled "Method and Apparatus for Global Routing of Electronic Messages", filed by John A. Mullan on the same day as the present application and incorporated herein by reference.

Mere conformance with CCITT standards is insufficient to ensure that an electronic messaging system provides its users with optimal global routing capabilities. While these standards provide a common language for intra- and intersystem communication, they do not address the actual method by which messages are routed within and between electronic messaging systems.

Owing to the vast array of both local and international users that any particular electronic messaging system may serve, a primary emphasis in developing such systems has been the method of routing messages. The merit of any such method is a function of its ability to satisfy the often conflicting requirements of flexibility and speed. In terms of flexibility, a routing method must accommodate large numbers of users and must recognize multiple levels of classifications into which such users fall. Additionally, the routing method should be flexible enough to handle situations where a message is received with an incomplete or invalid address. In terms of speed, the routing method should be able to quickly and accurately determine the optimum telecommunications path for an addressee. Likewise, the routing method should be able to quickly accommodate changes to the routing structure, such as the addition of new subscribers to the messaging system.

As noted above, most known electronic messaging systems store routing information in large, hierarchical tree structures which often require several megabytes of storage. In a typical structure for an electronic messaging system serving international subscribers, the highest level of the tree contains country codes for the various locations. Lower levels contain further breakdowns of the subscribers in each country, such as by organization or other domain-defined attributes. Finally, the lowest level contains the personal names of the individual users.

Hierarchical tree structures of this type are inefficient for a variety of reasons. First and foremost is the fact that such a structure can quickly grow to a very large size, requiring substantial resources in terms of both supporting software and processing time. Second, the large number of nodes and interconnections in these tree structures make modifications cumbersome and time-consuming. Third, the ultimate size of such structures may be unduly constrained by the physical limitations of the hardware on which the electronic messaging system runs.

In addition to problems associated with the tree structure itself, the routing methodology typically used with such a structure is inefficient, generally requiring intricate traversing of many tree branches. Such routing methods often fail to find a defined base or generic address to which a message may be delivered simply because a search has extended too far into the tree trying to find an exact match for the full address specified in a message. For example, where a message address has a valid country code and organization name but an incorrect recipient name, typical search algorithms fail to recognize that the message may nonetheless be deliverable to a general address for the organization. Also, in a worst-case scenario all of the branches of a tree structure must be searched to determine whether a complete match on an address exists.

In light of the limitations of the prior art, there is a need for a method of routing messages in an electronic messaging system that is both efficient and flexible. Furthermore, such a routing method should accommodate a structure for routing information that is simpler than known hierarchical tree structures. These needs and others are satisfied by the method and apparatus of the present invention.

SUMMARY OF THE INVENTION

The present invention provides a method and apparatus for routing messages in an electronic messaging system. The invention uses a multi-part search key and pattern recognition techniques to determine the ideal routing path for addresses defined to the system.

In an embodiment of an electronic messaging system according to the present invention, routing information for each defined user of the system is maintained in a data store keyed by user address. When a signal embodying a message is received by the system, an attempt is made to retrieve routing information using a search key generated from the specified recipient address. If no routing information is found, a portion of the recipient address is eliminated from the search key and another attempt is made to retrieve a routing path record. This process is repeated until either a routing path record is located or a predetermined number of attempts have been made. Assuming a routing path record exists, the message is transmitted along the telecommunications path associated with the recipient address.

In another embodiment of the present invention, each user is identified by a standard-format address including a number of individual codes, with each code corresponding to an increasingly more-detailed level of specificity for the user's address (e.g., country code, administration management domain code, organization code, recipient's name). As the electronic messaging system receives a message, a search key generator component of the message transfer system parses the individual codes from the specified recipient address and formats a search key. The message transfer system then sets a current search level indicator equal to the number of codes in the search key and sets a base level indicator corresponding to the lowest level of specificity at which a search will be performed before the message is deemed undeliverable. A database access component of the message transfer system then attempts to retrieve a routing path record from a routing information data store using a key equal to the search key. If no match is found, the most specific level of address information (e.g., the user's name) is stripped from the search key and the current search level indicator is decremented. If the current search level indicator is greater than or equal to the previously set base level, the data store is searched again using the new key. This process continues until either a match is found or until the current search level indicator is less than the base level indicator. Reaching the base level without finding a routing path record indicates there is no address information stored in the routing information data store that matches the recipient address on the message. In such a case, the message may be marked as non-deliverable or some other error-handling procedure may be invoked.

A routing information data store suitable for use with the method and apparatus of the present invention may be a sequential dataset sorted by user address. In such a case, the search for a routing path record matching a search key built from a recipient address ideally includes a binary search using pattern matching to determine whether or not a match exists. Alternatively, the routing information data store may be a direct-access dataset wherein an attempt may be made to directly retrieve a record having a key equal to the search key.

Features and advantages of the present method and apparatus are described below with reference to the drawings. Other features and advantages will be readily apparent to those skilled in the art.

BRIEF DESCRIPTION OF THE DRAWINGS

FIG. 3 is a record layout for a path record in a database of routing information accessible according to the present invention.

FIG. 4 is a record layout for an electronic message capable of being routed according to the present invention.

DETAILED DESCRIPTION

Figure 1:
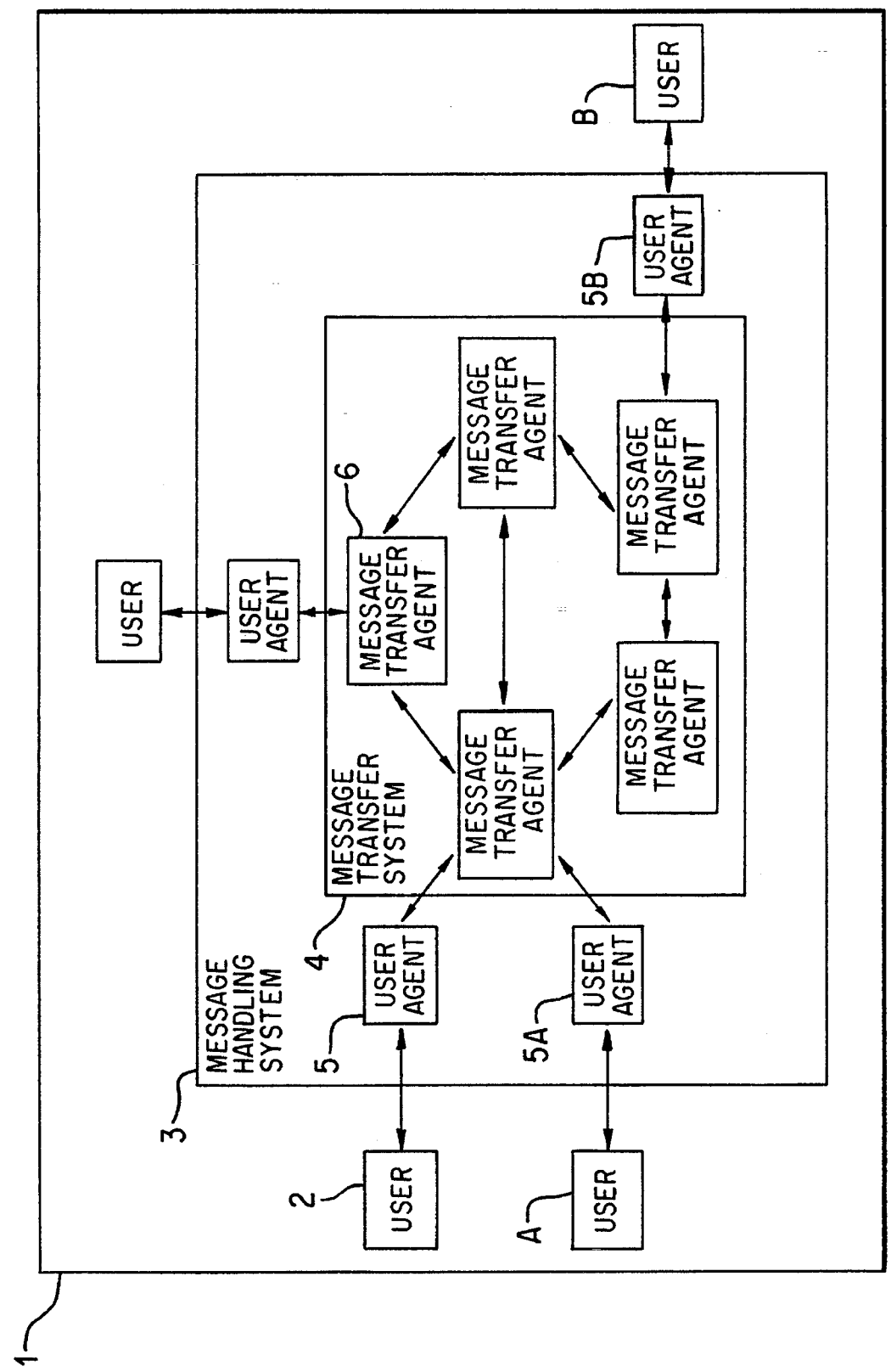
FIG. 1 is a block diagram of an electronic messaging system capable of using the method and apparatus of the present invention.

Referring to FIG. 1, an electronic messaging system 1 of a type to which the method and apparatus of the present invention are directed includes a message handling system 3 and a message transfer system 4. The message handling system 3 preferably comprises a fault-tolerant minicomputer executing software that performs message handling functions. The message handling system 3 contains several user agents 5, each of which provides message processing functions (e.g., composition, reading, printing, etc.) for a plurality of individual users 2. The message handling system 3 and the message transfer system 4 may communicate through electronic links between the user agents 5 and a number of message transfer agents 6, exchanging electronic signals representing messages. The message transfer agents 6 are responsible for routing messages among users of the electronic messaging system 1, as well as between users of the electronic messaging system 1 and users of other electronic messaging systems. The message transfer agents 6 may be selectively configured to perform distinct functions. For example, a given message transfer agent may be responsible for routing messages directly to and from one or more user agents, while another message transfer agent may be responsible for intermediate routing of messages received from other systems.

To illustrate the operation of an electronic messaging system such as the one shown in FIG. 1, assume a first user A wishes to send a message to a second user B. The first user logs onto the message handling system 3 from a user interface, such as a personal computer. The first user then composes a message using editing facilities provided by the user agent 5A coupled to the user interface. After keying in the desired message text and specifying an address for the intended recipient using the interface, the user would request that the message handling system 3 transmit the message. The user agent 5A then transmits a digital signal embodying the message to the message transfer system 4 via a communications path or a software bridge connecting the message handling system 3 and the message transfer system 4.

Upon receiving the digital signal, the message transfer system 4 may perform some initial processing of the signal, after which it will forward the message to one of its message transfer agents 6 for routing. The message transfer agent 6 analyzes the signal to identify the intended recipient of the message, and then attempts to retrieve routing information for that recipient. Assuming the recipient is defined to the message transfer system 4, the message transfer agent 6 will be able to associate a telecommunications routing path with the recipient. The message transfer agent 6 will then transmit the message as a digital signal along the telecommunications routing path to the user agent 5B servicing the recipient, user B. Upon logging onto the message handling system 3 from a user interface, user B will be notified that a message was received. User B may then read the message using the services of the user agent 5B, or perhaps download the message to the user interface for subsequent processing, such as printing the message.

Figure 2:
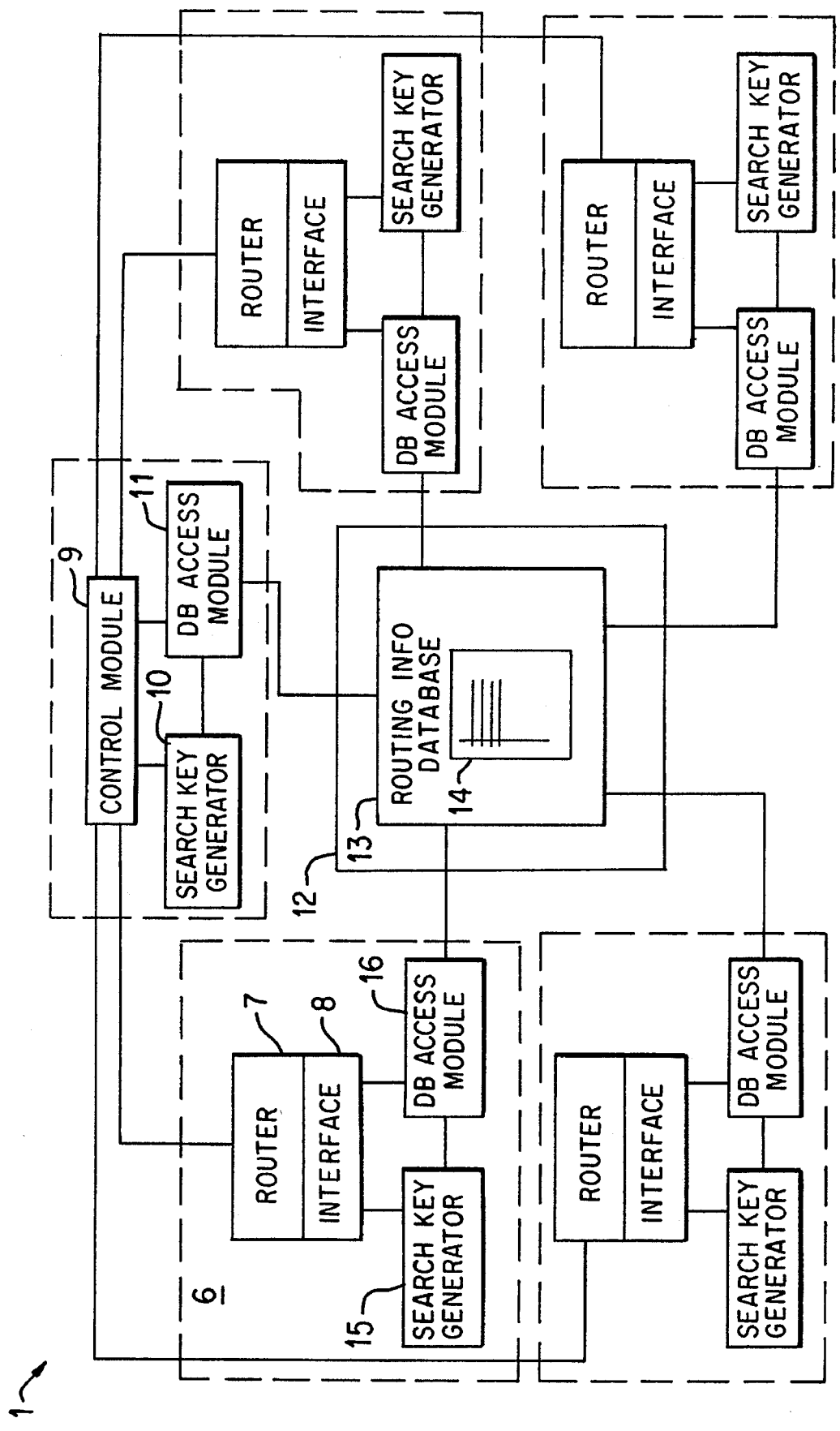
FIG. 2 is a block diagram of an embodiment of a message transfer system adapted to perform the method of the present invention.

In an embodiment of the present invention shown in FIG. 2, a message transfer system 4 includes a plurality of message transfer agents 6, with each message transfer agent 6 including a router 7 and an interface 8 for communicating with external modules (e.g., a user agent) or with other message transfer agents. The message transfer system 4 may comprise one or more suitable computers capable of functioning as a telecommunications switching device. One such computer ideally suited to the present invention is the "DATA GENERAL AVIION" Model 5250 workstation running a "UNIX" operating system. The individual message transfer agents 6 ideally comprise executable software modules resident on the switching device.

A control module 9 is coupled to each of the message transfer agents 6 and coordinates the activities of the message transfer system 4. The message transfer system 4 also includes a memory 12 containing a routing information database 13. A database access module 11 is adapted to retrieve records from the routing information database 13 using search keys built by a search key generator 10.

The routing information database 13 contains a routing path table 14 with records formatted, for example, as in FIG. 3. Each record is keyed by a user address 20 containing codes for the user's country 21, administration management domain 22, organization 23 and personal name 24. In addition, the record contains identifiers for both a remote message transfer agent 18 and a local message transfer agent 19 servicing the user associated with the record. These fields may be used to describe a situation where a single electronic messaging system services users at remote geographic locations. In such a case, a first message transfer agent at a local location (i.e., the local MTA) may be assigned to a remote user for relaying locally-originating messages to that remote user; while a second message transfer agent at the remote site (i.e., the remote MTA) may be assigned to the user for final routing of the message. Finally, the routing path record contains a route number 17 identifying either a physical or logical telecommunications path that leads to the user. The routing information database ideally comprises either a sequential dataset sorted by user address or a direct-access dataset keyed by user address; however, those skilled in the art will recognize that other modes of storage and associated access methods may be equally compatible with the present invention.

The routing approach of the present invention is compatible with many different addressing schemes. The addressing scheme used to identify users of any given electronic messaging system is generally dictated by characteristics of the user group being serviced and system efficiency considerations. One such addressing scheme is described in the U.S. patent application entitled "Method and Apparatus for Global Routing of Electronic Messages", filed by John A. Mullan on the same day as the present application and incorporated herein by reference above. That addressing scheme contemplates two addresses for each system user: an externally-meaningful address identifying the user to others, and an internally-meaningful address reflecting the system configuration. Translation between the internal and external addresses is enabled by a conversion table.

In a preferred embodiment of a routing path table 14 adapted for use with the method and apparatus of the present invention, the user address 20 corresponds to an X.400-compliant address as described in standards promulgated by the Consultive Committee for International Telegraphy and Telephony (CCITT). FIG. 4 contains a record layout for an electronic message in X.400 format. The record includes a standard-format recipient address 25, a similarly-formatted originator address 26 and a message text 27. The recipient address 25 includes a country code 28 corresponding to the physical location of the associated user, an administration management domain code 29, an organization code 30 and the recipient's name 31. The administration management domain code 29 and organization code 30 may be used to classify users of the messaging system according to physical or logical constraints. The format of the recipient address corresponds to the format of the routing path table's 14 user address key 20, as illustrated in FIG. 3.

Figure 5:
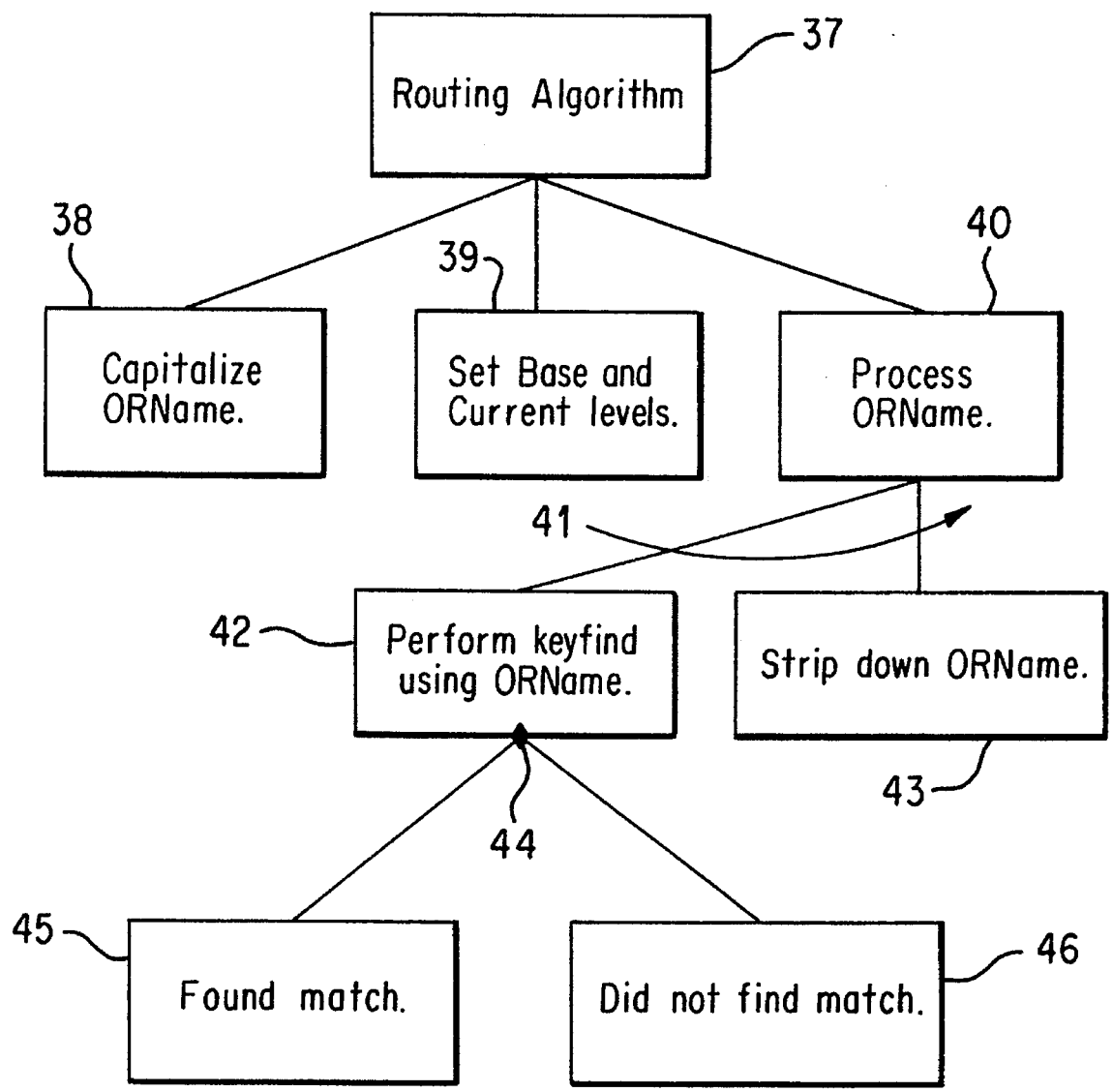
FIG. 5 is a flow diagram of an embodiment of the method of the present invention.

A preferred embodiment of a method of routing electronic messages is described by the structure chart of FIG. 5. The method is executed by a message transfer system including the components discussed above with reference to FIG. 2. Upon receipt of an electronic signal embodying a message (step 37), the user address for the intended recipient is parsed from the signal and all letters in the address are capitalized to facilitate pattern matching (step 38). A base level identifier is set to denote the key level at which searching should cease (e.g., "2" if no searching beyond country and administration management domain is desired), and a current level identifier is set to the number of codes present in the address (e.g., "4" if the address contains a country code, an administration management domain code, an organization code and a user name) (step 39). An iterative process (step 40) then attempts to find a record in the routing information database corresponding to the address in the message.

As the first step of the iterative process, an attempt is made to retrieve a routing path record using the search key (step 42). In this embodiment, the search key consists of the four codes present in the recipient's address. If a path record is successfully retrieved, the associated routing information is determined from the retrieved record (step 45) and the message is routed to the intended recipient accordingly; otherwise, the lowest level of detail (i.e., the most specific addressing information) in the multi-part search key is stripped from the search key (step 43). In this embodiment, the user name would be stripped from the key. After the current level indicator is decremented, the search is repeated with the new search key (step 42), this time consisting of three codes. This iterative process continues until either a matching routing path record is located or the predetermined base level is reached. If no matching path record is found, the message transfer system may mark the message "non-deliverable" and/or initiate error-handling procedures.

The method steps illustrated in FIG. 5 may also be described in terms of pseudocode, as shown in the following table.

| Code | Operation |
| --- | --- |
| Move Recipient_Address to Search_Key | Format search key with codes from recipient address (steps 37, 38) |
| Capitalize_Search_Key | |
| Found = "FALSE" | Set lowest level to search and set current level of search to number of address codes in search key (step 39) |
| Base_Lvl = "2" | |
| Curr_Lvl = Lgth_of_Search_Key | |
| Found = Keyfind(Search_Key) | Make initial attempt to retrieve routing information record for search key (steps 40, 42) |
| IF (Found) | If routing information found, |
| THEN RETURN Rte_Num | return routing path identifier (steps 40, 45) |
| ENDIF | |
| WHILE (Curr_Lvl not > = Base_Lvl) DO | Loop until lowest level of search reached or routing information found (steps 41–46) |
| Curr_Lvl = Curr_Lvl - 1 | Decrement current search level indicator and strip last code from search key (step 43) |
| Search_Key = Set_Key(Curr_Lvl) | |
| Found = Keyfind(Search_Key) | Attempt to retrieve routing information record for new search key (step 42) |
| IF (Found) THEN RETURN Rte_Num | Return routing path identifier if routing information record found (steps 45, 40) |
| ENDIF | |
| ENDDO | |
| RETURN Non_Delivery_Notice | Signal error if no routing information found for recipient address (steps 46, 40) |

To illustrate the routing method and apparatus of the present invention by way of example, assume an electronic messaging system receives an electronic transmission representing an X.400-format message containing the following recipient address:

&IR%Dublin!Acme@John Doe

According to the format described in FIG. 4, this message is intended for user "John Doe", a member of an organization called "Acme" serviced by administration management domain "Dublin" in Ireland ("IR"). Here, the individual codes comprising the address are separated by delineators (e.g., "&", "!", "@") recognized by all X.400 compatible messaging systems. Further assume the system includes a memory-resident routing path table formatted as in FIG. 3 and containing the following entries:

| Rte# | Rmt MTA | Lcl MTA | User Address Key |
| --- | --- | --- | --- |
| 1. | 003 China_MTA | USMTA | &CH%REP of CHINA |
| 2. | 004 France_MTA | USMTA | &FR%PARIS@GUITONE |
| 3. | 005 Ireland_MTA | USMTA | &IR%DUBLIN |
| 4. | 001 Turkey_MTA | USMTA | &TK%BRE@SEZ1 |

The routing path records are ideally stored in alphabetical order by user address key to facilitate determination of the presence or absence of a match for a given search key.

Employing the apparatus of FIG. 2 and the associated method of FIG. 5, the electronic signal embodying the message intended for user John Doe is received by a router 7 of a message transfer agent 6. An interface 8 then invokes the search key generator 15, which parses the several address codes from the recipient address, capitalizes all of the letters in the address codes and formats a search key as follows:

&IR%DUBLIN!ACME@JOHN DOE

The router 7 sets the current search level to "4", corresponding to the number of address codes in the search key, and sets the base level to "2", for example, to indicate that searching should cease if no match is found for the country and administration management domain specified in the address.

The router 7 then invokes the database access module 16 to attempt to retrieve a record having a key equal to the search key from a routing path table 14. In this example, no matching record exists. Thus, the router 7 decrements the current search level to "3" and invokes the search key generator 15 to strip the lowest level of detail from the search key. The new search key will be:

&IR%DUBLIN!ACME

Once again, the router 7 invokes the database access module 16 to attempt to retrieve a record matching the new search key from the routing path table 14. Again, however, no matching record exists.

The router 7 once again decrements the search level to "2" and invokes the search key generator to strip the lowest level of detail from the search key (i.e., the organization code "ACME"), leaving:

&IR%DUBLIN

This time, the database access module 16 will find a match on the third entry in the routing path table 14 and will return that record to the router 7. The router 7 may then use the associated routing number (i.e., "005") and remote MTA code (i.e., "IRELAND_MTA") to transmit the message along the appropriate telecommunications line. The recipient will ultimately receive the message as it was originally received by the message transfer agent, including the entire recipient address. The search key formatting and stripping operations do not alter the actual contents of the message.

Significantly, the routing method and apparatus of the present invention enabled the electronic message to be delivered even though no exact match for the specified recipient address existed in the routing information database. In a case such as this, the message transfer agent corresponding to the remote MTA code specified in the routing path record would be responsible for subsequently routing the message to the user. This situation might exist where, for example, the message transfer agent which initially received the message in the preceding example was configured as an intermediate relay station for efficiency reasons. Such a configuration could be accomplished by limiting the routing information to which the MTA has access to partial addresses for a particular class of users (e.g., those users located in Dublin, Ireland). The search process would then return a routing path leading to a second message transfer agent, as opposed to a routing path leading directly to the intended recipient. This second MTA would then perform a similar search process, but would have access to the more detailed routing information required to forward the message to the recipient. If, on the other hand, a match had existed in the routing information database for the complete recipient address, the initial message transfer agent would have been able to route the message directly.

The actual search for a routing path record may be performed by any suitable method known in the art. One such method that is ideal for the present invention is a binary search in conjunction with pattern matching. Assuming the routing path records are stored in alphabetical key order, a binary search can quickly and efficiently determine whether or not a matching record exists in the database. Binary search techniques and pattern matching are well known in the art, and thus are not described in detail herein. Other search methods may be equally effective depending on the access method available for any particular database.

While the present invention has been described with reference to specific embodiments, it will be apparent to those skilled in the art that many modifications and variations are possible. Accordingly, the present invention embraces all alternatives, modifications and variations that fall within the spirit and scope of the appended claims, as well as all equivalents thereof.

What is claimed is:

1. A method for routing a message encoded in a signal received by an electronic messaging system, the electronic messaging system including a data store of routing information, the message containing a user address having a plurality of address codes, the method comprising:

(a) setting a search level indicator according to a number of address codes in the user address;

(b) attempting to retrieve routing information associated with the plurality of address codes in the user address;

(c) eliminating one of the plurality of address codes from the user address if no routing information is retrieved;

(d) repeating steps (a) through (c) until routing information is successfully retrieved or the search level indicator equals a predetermined base level; and (e) in the event routing information is successfully retrieved, routing the message according to said routing information.

2. The method of claim 1 wherein the one of the plurality of address codes eliminated from the user address corresponds to a most specific level of address information contained in the user address.

3. The method of claim 2 wherein the step of attempting to retrieve routing information includes a binary search of the routing information data store.

4. The method of claim 3 wherein the binary search includes pattern matching to determine whether a match for the plurality of address codes exists in the routing information data store.

5. The method of claim 2 further comprising the step of indicating an invalid user address if no routing information is retrieved within the predetermined number of attempts.

6. A method for routing a message encoded in a signal received by an electronic messaging system, the electronic messaging system including a routing information database containing a plurality of routing path records keyed by user addresses, the message containing a user address having a plurality of address codes corresponding to different levels of specificity, the method comprising:

(a) setting a search level indicator to a number of address codes in the user address of the message, the search level indicator corresponding to a current level of specificity;

(b) formatting a search key using a set of address codes parsed from the user address and corresponding to the current level of specificity;

(c) attempting to retrieve a routing path record associated with the search key;

(d) decrementing the search level indicator if no routing path record is retrieved; and (e) repeating steps (b) through (d) until a routing path record is successfully retrieved or the search level indicator equals a predetermined base level.

7. The method of claim 6 wherein the step of attempting to retrieve a path record comprises a binary search of the plurality of routing path records.

8. The method of claim 7 wherein the binary search includes pattern matching to determine whether a match for the search key exists.

9. The method of claim 6 further comprising the step of routing the message according to information contained in a retrieved routing path record.

10. The method of claim 9 further comprising the step of indicating an invalid user address when the search level indicator equals the predetermined base level.

11. A message transfer device for routing a message encoded in a signal received by an electronic messaging system including a memory and a routing information dataset stored therein, the routing information dataset associating communications paths with user addresses, the message including a user address comprising a plurality of address codes, the message transfer device comprising:

(a) a search key generator adapted to format a search key comprising a set of address codes parsed from the user address of the message;

(b) a database access module capable of retrieving routing information from the routing information dataset; and (c) a routing module coupled to the search key generator and the database access module, the routing module adapted to coordinate an iterative search of the routing information dataset using a search key comprising a progressively decreasing number of address codes.

12. The message transfer device of claim 11 wherein the iterative search uses a search key corresponding to a progressively less specific set of address codes.

13. The message transfer device of claim 12 wherein the routing module is adapted to transmit the message to an intended recipient according to the retrieved routing information.

14. The message transfer device of claim 13 wherein the database access module is adapted to perform a binary search of the routing information dataset.

15. A message transfer device for routing a message in an electronic messaging system including a memory, the message including a plurality of address codes, the message transfer device comprising:

(a) a search key generator adapted to parse a subset of the plurality of address codes from the message and use the subset of the plurality of address codes to format a search key, the search key generator further adapted to reformat the search key by eliminating one of the subset of the plurality of address codes, wherein the search key generator maintains a search level indicator corresponding to a number of address codes in the search key;

(b) a routing information dataset stored in the memory of the electronic messaging system, the routing information dataset containing a plurality of routing path records associating a communications path with user address information;

(c) a data access module capable of retrieving a routing path record having user address information corresponding to the search key; and (d) a routing module coupled to the search key generator and the data access module, the routing module capable of transmitting a message along a communications path specified in a retrieved routing path record and adapted to coordinate an iterative operation comprising:

(i) attempting to retrieve a routing path record corresponding to the search key using the data access module, (ii) indicating whether a routing path record was successfully retrieved by the data access module, and (iii) reformatting the search key using the search key generator if a routing path record was not successfully retrieved.

16. The message transfer device of claim 15 wherein the routing information dataset comprises a dataset sorted by user address information.

17. The message transfer device of claim 16 wherein the data access module performs a binary search of the plurality of routing path records.

18. The message transfer device of claim 17 wherein the message conforms to X.400 standards.

19. The message transfer device of claim 15 wherein the routing information dataset comprises a direct access dataset keyed by user address information.

20. A message transfer device for routing a message in an electronic messaging system having a memory coupled thereto, the message including an externally meaningful address corresponding to an intended recipient, the message transfer device comprising:

(a) an address translator adapted to convert an externally meaningful address to an internal address reflecting a configuration of the electronic messaging system;

(b) a search key generator adapted to parse a set of address codes from the internal address and use the set of address codes to format an initial search key, the search key generator further adapted to reformat a search key by eliminating one of the set of address codes from the search key;

(c) a routing information dataset stored in the memory coupled to the electronic messaging system, the routing information dataset containing a plurality of routing path records associating a communications path with user address information;

(d) a data access module capable of retrieving a routing path record having user address information corresponding to the set of address codes in the search key; and (e) a routing module coupled to the search key generator and the data access module, the routing module capable of transmitting a message along a communications path specified in a retrieved routing path record and adapted to coordinate an iterative operation beginning with a search key formatted by the search key generator, the iterative operation comprising:

(i) attempting to retrieve a routing path record corresponding to the search key using the data access module, (ii) indicating whether a routing path record was successfully retrieved by the data access module, and (iii) reformatting the search key using the search key generator if a routing path record was not successfully retrieved.

21. The message transfer device of claim 20 wherein the address translator comprises a conversion table stored in a memory of the electronic messaging system and including a plurality of table entries associating internal address codes with external address codes.

22. A method for routing a signal received by a switching device, the switching device including a memory associating routing information with user address information, the signal containing an encoded representation of a user address comprising a plurality of address codes, the method comprising the steps of:

(a) analyzing the received signal to identify the plurality of address codes encoded therein;

(b) formatting a search key using the plurality of address codes;

(c) setting a search level indicator according to the number of address codes in the search key;

(d) attempting to retrieve routing information from the memory associated with the plurality of address codes in the search key;

(e) eliminating one of the plurality of address codes from the search key if no routing information is successfully retrieved;

(f) repeating steps (c) through (e) until routing information is successfully retrieved or the search level indicator equals a predetermined level; and (g) in the event routing information is successfully retrieved, routing the signal according to the retrieved routing information.

23. The method of claim 22 wherein the step of analyzing the received signal comprises parsing address codes from predetermined positions of the received signal, the predetermined positions corresponding to portions of an electronic messaging address in which each of a plurality of address codes represents a unique degree of specificity.

* * * * *

UNITED STATES PATENT AND TRADEMARK OFFICE
CERTIFICATE OF CORRECTION

PATENT NO. : 5,459,717
DATED : October 17, 1995
INVENTOR(S) : John A. MULLAN et al.

It is certified that error appears in the above-indentified patent and that said Letters Patent is hereby corrected as shown below:

ON THE TITLE PAGE, item [54], line 2: change "MESSAGERS" to --MESSAGES--.

| Column | Line | |
|---|---|---|
| 1 | 2 | Change "MESSAGERS" to --MESSAGES--. |
| 1 | 24 | Change "sewer." to --server.--. |

Signed and Sealed this

Eleventh Day of June, 1996

Attest:

BRUCE LEHMAN

*Attesting Officer*              *Commissioner of Patents and Trademarks*